United States Patent
Mans Fibla et al.

(10) Patent No.: US 8,409,478 B2
(45) Date of Patent: Apr. 2, 2013

(54) FLAME RETARDANT COMPOSITION

(75) Inventors: Vicente Mans Fibla, La Zaida (ES); David Garcia Martinez, La Zaida (ES)

(73) Assignee: Budenheim Iberica, S.L. Sociedad En Comandita, La Zaida (Zaragoza) (ES)

( * ) Notice: Subject to any disclaimer, the term of this patent is extended or adjusted under 35 U.S.C. 154(b) by 403 days.

(21) Appl. No.: 12/665,559

(22) PCT Filed: May 20, 2008

(86) PCT No.: PCT/EP2008/056178
§ 371 (c)(1),
(2), (4) Date: Apr. 22, 2010

(87) PCT Pub. No.: WO2008/155187
PCT Pub. Date: Dec. 24, 2008

(65) Prior Publication Data
US 2010/0200819 A1   Aug. 12, 2010

(30) Foreign Application Priority Data

Jun. 20, 2007 (ES) .................... 200701696

(51) Int. Cl.
*A62D 1/00* (2006.01)
*C09K 3/00* (2006.01)
*C09K 21/00* (2006.01)
*C23F 11/00* (2006.01)

(52) U.S. Cl. ......... 252/602; 252/2; 252/387; 252/389.2; 252/389.22; 252/389.23; 252/389.52; 252/603; 252/610

(58) Field of Classification Search .................. 252/610, 252/2, 387, 389.2, 389.22, 389.23, 389.52, 252/602, 603
See application file for complete search history.

(56) References Cited

U.S. PATENT DOCUMENTS

| | | | |
|---|---|---|---|
| 3,196,108 | A | 7/1965 | Nelson et al. |
| 3,257,316 | A | 6/1966 | Langguth et al. |
| 3,809,653 | A | 5/1974 | Sansing et al. |
| 3,960,735 | A | 6/1976 | Lacey |
| 4,145,296 | A | 3/1979 | Fox et al. |
| 6,391,384 | B1 | 5/2002 | Deblois et al. |
| 2006/0147632 | A1 * | 7/2006 | Zhang et al. .................. 427/297 |

FOREIGN PATENT DOCUMENTS

| | | |
|---|---|---|
| EP | 449159 A2 * | 10/1991 |
| GB | 2 311 939 A | 10/1997 |
| WO | 02/43812 A2 | 6/2002 |

* cited by examiner

*Primary Examiner* — Harold Pyon
*Assistant Examiner* — Tanisha Diggs
(74) *Attorney, Agent, or Firm* — Sughrue Mion, PLLC

(57) ABSTRACT

The invention relates to a flame retardant composition, particularly designed for fire fighting with aerial means. The retardant composition comprises a liquid ammonium polyphosphate of chain length with a value of n between 2 and 3, n being the number of condensation groups, and an ammonium polyphosphate in powder form in suspension, with a chain length with a value of n between 100 and 1500. In addition to the above, the flame retardant composition comprises corrosion inhibitors, in particular zinc orthophosphate dihydrate, and at least one surfactant agent as wetting agent or dispensing agent, an organic or inorganic thickening agent and at least one coloring agent.

19 Claims, No Drawings

FLAME RETARDANT COMPOSITION

This is an application filed under 35 U.S.C. 371 of PCT/EP2008/056178, filed May 20, 2008, which claims benefit from Spain 200701696, filed Jun. 20, 2007.

TECHNICAL FIELD OF THE INVENTION

The present invention relates to a flame retardant of those used in the fight against forest fires, to prevent or delay the propagation thereof. In particular, the flame retardant is of those which comprise liquid ammonium polyphosphates in their composition.

BACKGROUND OF THE INVENTION

At the beginning of the sixties, the use of aerial means in fighting forest fires to prevent or delay their propagation became widespread, spreading flame retardants, also called fire retardants, specifically on the forest area.

It is known that the typical compositions of fire retardants basically comprise a fire suppressant electrolyte, constituted by salts such as ammonium phosphates and sulfates, viscosity modifiers and pigments.

Due to the ease of transport, flame retardants contain polyphosphates in liquid form and, furthermore, corrosion inhibitors given the corrosive action of the liquid polyphosphates on the components of aluminium or tanks used in the planes.

U.S. Pat. Nos. 3,196,108 and 3,257,316 disclose typical compositions of flame retardants, consisting of aqueous solutions of mono and diammonium salts of the orthophosphoric acid, of a thickening agent such as attapulgite, guar gum or alginates, of colouring agents to improve the visibility of the retardant after it has been thrown and of corrosion inhibitors such as potassium dichromate.

U.S. Pat. No. 3,960,735 disclosed that the tendency of liquid polyphosphates to corrode aluminium was inhibited by the anticorrosive action of ferric ferrocyanide, whereby the component passed to be included as inhibiting agent in the flame retardant composition.

Nevertheless, bearing in mind the environmental impact caused by ferric ferrocyanide, new corrosion inhibitors have been studied, especially additives of the iron ion in its salt forms, such as, for example, pyrophosphates, oxalates and citrates, as disclosed in WO 02/43812.

Despite the advances made in recent years, there is still the need to improve the efficacy of flame retardant compositions used in fire fighting with aerial means.

EXPLANATION OF THE INVENTION

With the purpose of providing a solution to the problems posed, a new flame retardant composition was disclosed, particularly designed for fire fighting with aerial means, of those which comprise a liquid ammonium polyphosphate.

In essence, the flame retardant composition object of the invention is characterized in that it comprises in suspension an ammonium polyphosphate in powder form.

According to a characteristic of the invention, the liquid ammonium polyphosphate has a chain length with a value of n comprised between 1 and 5, n being the number of condensation groups. Condensation group is understood as the unit of phosphate anion (ammonium phosphate) which bonds with another unit to form polymers (polyphosphates), as shown below:

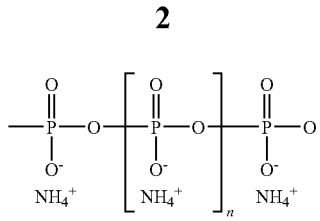

Preferably, the liquid ammonium polyphosphate has a chain length with a value of n comprised between 2 and 3, n being the number of condensation groups.

In accordance with another characteristic of the invention, the ammonium polyphosphate in powder form has a chain length with a value of n comprised between 100 and 1500.

According to another characteristic of the invention, the liquid ammonium polyphosphate has a chain length with a value of n comprised between 1 and 5, and the ammonium polyphosphate in powder form has a chain length with a value of n comprised between 100 and 1500, n being the number of condensation groups.

Preferably, the ammonium polyphosphate in powder form has a chain length with a value of n comprised between 900 and 1000.

In accordance with another characteristic of the invention, the liquid ammonium polyphosphate has an ammonia content expressed as nitrogen which is comprised between 7% and 12% by weight of the total of the liquid ammonium polyphosphate.

Preferably, the liquid ammonium polyphosphate has an ammonia content expressed as nitrogen which is comprised between 9% and 10% by weight of the total of the liquid ammonium polyphosphate.

According to another characteristic of the invention, the liquid ammonium polyphosphate has a phosphorous content expressed as phosphoric anhydride which is comprised between 20% and 37% by weight of the total of the liquid ammonium polyphosphate.

Preferably, the liquid ammonium polyphosphate has a phosphorous content expressed as phosphoric anhydride which is comprised between 30% and 34% by weight of the total of the liquid ammonium polyphosphate.

In accordance with another characteristic of the invention, the ammonium polyphosphate in powder form has an ammonia content expressed in the form of nitrogen comprised between 10% and 20% by weight of the total of the ammonium polyphosphate in powder form, preferably between 13% and 14% by weight of the total of the ammonium polyphosphate in powder form.

According to another characteristic of the invention, the ammonium polyphosphate in powder form has a phosphorous content expressed in the form of phosphoric anhydride comprised between 60% and 75% by weight of the total of the ammonium polyphosphate in powder form, preferably between 70% and 71% by weight of the total of the ammonium polyphosphate in powder form.

In accordance with another characteristic of the invention, the ammonium polyphosphate in powder form has a granulometry expressed in mean particle size comprised between 1 and 20 microns, and wherein 100% of said particles have a size lower than 40 microns.

Preferably, the ammonium polyphosphate in powder form has a granulometry expressed in mean particle size comprised between 5 and 8 microns, and wherein 100% of said particles have a size lower than 30 microns.

According to another characteristic of the invention, the retardant composition has a liquid ammonium polyphosphate content comprised between 70% and 95% by weight of the total of the flame retardant composition, preferably between 87% and 94% by weight of the total of the flame retardant composition.

In accordance with another characteristic of the invention, the retardant composition has a content of ammonium polyphosphate in powder form comprised between 5% and 30% by weight of the total of the flame retardant composition, preferably between 6% and 13% by weight of the total of the flame retardant composition.

In accordance with another characteristic of the invention, the retardant composition has an ammonia content expressed as nitrogen comprised between 6% and 12% by weight of the total of the flame retardant composition, preferably between 8% and 10% by weight of the total of the flame retardant composition.

According to another characteristic of the invention, the retardant composition has a phosphorous content expressed as phosphoric anhydride comprised between 30% and 40% by weight of the total of the flame retardant composition, preferably between 32% and 35% by weight of the total of the flame retardant composition.

In accordance with another characteristic of the invention, the retardant composition comprises at least one metal salt of the orthophosphoric acid as corrosion inhibitor for alloys of aluminium, steel, bronze and magnesium.

In accordance with another characteristic of the invention, the metal salt of the orthophosphoric acid is a salt of the group formed by dicalcium phosphates, calcium phosphates, aluminium tripolyphosphates, magnesium phosphates, calcium magnesium phosphates and zinc phosphates.

Preferably, the metal salt of the orthophosphoric acid is a salt of anhydrous or hydrated zinc.

According to another characteristic of the invention, the metal salt of the orthophosphoric acid is a zinc orthophosphate dihydrate.

In accordance with another characteristic of the invention, the proportion of the zinc orthophosphate dihydrate is comprised between 0.01% and 5% by weight of the total of the retardant composition, preferably between 0.2% and 0.5% by weight of the total of the retardant composition.

In accordance with another characteristic of the invention, the retardant composition comprises at least one surfactant agent as wetting agent or dispensing agent, an organic or inorganic thickening agent and at least one colouring agent.

DETAILED DESCRIPTION OF THE INVENTION

The detailed description stated below represents a complete and clear description of the present invention for a person skilled in the art, but should not be considered a limitation of the essential aspects of the objects thereof.

At present, many flame retardant compositions are known for fire fighting with aerial means, wherein a liquid ammonium polyphosphate is used as main retardant component. In particular, it has been demonstrated that the phosphorous content, expressed in the form of phosphoric anhydride, is the decisive factor in the flame retardant efficacy of the composition. In an effort to achieve high phosphoric anhydride contents, the flame retardant composition object of the invention has been developed according to which it has been possible to incorporate in a liquid ammonium polyphosphate an ammonium polyphosphate in powder form, the latter remaining in suspension, increasing in this way the phosphorous content of the composition and, therefore, the retardant action of the resulting composition.

Below, the characteristics of the polyphosphates in liquid and in powder form, which have made possible the suspension of the polyphosphate in powder form avoiding the formation of sediments during the storage of the flame retardant composition, are detailed.

With regard to the liquid ammonium polyphosphate, it is of short chain length, with a number n of condensation groups comprised between 1 and 5, and preferably between 2 and 3. For its part, the ammonium polyphosphate in powder form, which remains in suspension, is a polyphosphate of long chain length, wherein n has a value comprised between 100 and 1500, and preferably between 900 and 1000.

In relation to the ammonia and phosphorous contents, the liquid ammonium polyphosphate has an ammonia concentration, expressed as nitrogen, comprised between 7% and 12%, preferably between 9% and 10%, by weight of the total of the of the liquid ammonium polyphosphate, and a phosphorous content, expressed as phosphoric anhydride, comprised between 20% and 37%, preferably between 30% and 34%, by weight of the total of the liquid ammonium polyphosphate.

In turn, the ammonium polyphosphate in powder form has an ammonia concentration, expressed as nitrogen, comprised between 10% and 20%, preferably between 13% and 14%, by weight of the total of the ammonium polyphosphate in powder form, and a phosphorous content, expressed as phosphoric anhydride, comprised between 60% and 75%, preferably between 70% and 71%, by weight of the total of the ammonium polyphosphate in powder form.

The granulometry expressed in mean particle size of the ammonium polyphosphate in powder form is comprised between 1 and 20 microns, wherein 100% of said particles have a size lower than 40 microns. It should be mentioned that preferably ammonium polyphosphates in powder form are used with a granulometry, expressed in mean particle size, comprised between 5 and 8 microns, wherein 100% of the particles have a size lower than 30 microns.

The liquid ammonium polyphosphate and the ammonium polyphosphate in powder form previously described are combined so that the resulting flame retardant composition has a liquid ammonium polyphosphate content comprised between 70% and 95%, and an ammonium polyphosphate content in powder form comprised between 5% and 30%, expressed in percentage by weight of the total of the retardant composition. Preferably, the flame retardant composition has a liquid ammonium polyphosphate content comprised between 87% and 94% by weight of the total of the retardant composition, and a content of ammonium polyphosphate in powder form comprised between 6% and 13% by weight of the total of the retardant composition.

The ammonia content, expressed as nitrogen, of the flame retardant composition is comprised between 6% and 12% by weight of the total of the retardant composition, whilst the phosphorous content, expressed as phosphoric anhydride, is comprised between 30% and 40% by weight of the total of the retardant composition.

It should be mentioned that preferably the flame retardant composition has an ammonia content, expressed as nitrogen, comprised between 8% and 10% by weight of the total of the retardant composition, and a phosphorous content, expressed as phosphoric anhydride, comprised between 32% and 35% by weight of the total of the retardant composition.

As it has been commented, the aforementioned retardant composition is indicated for its use with aerial means used in fire extinguishing and prevention. Said aerial means are provided with metal parts and tanks which contain therein the flame retardant components which are later thrown or spread on the land to treat. In the aforementioned flame retardant composition, the used ammonium polyphosphates make said composition have a corrosive action on materials such as aluminium, iron, bronze and magnesium, integral parts of the aerial means in contact with the composition.

To avoid the corrosion of said materials, the efficacy of corrosion inhibitors with which to minimize the corrosive action of the ammonia polyphosphates in the retardant composition has been studied, bearing in mind at the same time that said inhibitors do not result harmful for the environment. As corrosion inhibitors, metal salts of the orthophosphoric acid have been studied, such as dicalcium phosphate, calcium phosphate, aluminium tripolyphosphate, magnesium phosphate, calcium magnesium phosphate and zinc phosphate, i.e. single or multiple salts are used, which as anion or anions contain one or several of those which can be produced from the orthophosphoric acid, such as biphosphate, dihydrogen phosphate or phosphate; and which as cations contain one or multiple metal cations.

The results obtained with anhydrous or hydrated zinc salts of the orthophosphoric acid have had special relevance, and in particular, with zinc orthophosphate dihydrate.

In particular, the efficacy in corrosion inhibition has been demonstrated by experimentation for aluminium, steel, bronze and magnesium alloys of zinc orthophosphate dihydrate in the aforementioned retardant composition when said salt is added in a proportion comprised between 0.01% and 5%, preferably between 0.2% and 0.5%, by weight of the total of the retardant composition.

In addition to the ammonium polyphosphates in liquid and in powder form and the corrosion inhibitor, the retardant composition also comprises at least one wetting agent, an organic or inorganic thickening agent and at least one colouring agent.

The test described below reveal the greater efficacy of the flame retardant composition object of the invention as well as the corrosion inhibition.

Test 1:

The test described here determines the efficacy against fire of the retardant composition and was performed in accordance with the methodology of the Forest Research Centre (CIFOR), which consists of a gravimetric monitoring control of a forest fuel formed by dead needles of Pinus Pinea. To carry it out, a known quantity of weighted dry fuel is homogenously placed on a combustion table which also rests on a balance.

For the test, the flame retardant composition diluted in water was used in the proportion of one part by volume of the retardant composition and four parts by volume of water, dispensing 1 l/m$^2$ by spraying, performing three monitorings of the fuel treated with the diluted retardant composition.

The combustible treated with the diluted retardant composition was left to rest for 15 minutes at ambient temperature and later maintained in an oven at 42±2° C. during 30, 90 minutes and during 3 hours.

The efficacy test consists of evaluating the weight loss of the fuel treated throughout the passage of fire. The efficacy is evaluated by classification in accordance with the criteria of Table 1:

TABLE 1

| Weight consumed in treated area | Classification |
|---|---|
| 0-20% | 0 |
| 20-40% | 1 |
| 40-60% | 2 |

TABLE 1-continued

| Weight consumed in treated area | Classification |
|---|---|
| 60-80% | 3 |
| 80-100% | 4 |

The first test was performed with a retardant composition, in whose composition only intervenes a liquid ammonium polyphosphate of short chain length, with a number n of condensation groups between 2 and 3, with an ammonia content expressed in the form of nitrogen of approximately 10% by weight of the total of the liquid ammonium polyphosphate, and with a phosphorous content expressed in the form of phosphoric anhydride of approximately 30% by weight of the total of the liquid ammonium polyphosphate.

The flame retardant composition subjected to testing, only composed by the described liquid ammonium polyphosphate, gave the results shown in Table 2.

TABLE 2

| Test conditions | | | Classification per % of weight consumed | |
|---|---|---|---|---|
| Treatment | Dose | Concentration | Test 1 | Water |
| 15 min. dropping + 30 min. oven 42° C. | 1 l/m$^2$ | 1:4 | 1 (25%) | 4 (91%) |
| 15 min. dropping + 90 min. oven 42° C. | 1 l/m$^2$ | 1:4 | 1 (31%) | 4 (94%) |
| 15 min. dropping + 3 hours oven 42° C. | 1 l/m$^2$ | 1:4 | 2 (49%) | 4 (95%) |

Test 2

For this second test, a retardant composition was used with a content of 95% by weight of the liquid ammonium polyphosphate described in Test 1 of the total of the retardant composition, the composition being completed with the addition of an inhibiting agent, a zinc salt of the orthophosphoric acid, specifically zinc orthophosphate dihydrate, in a proportion between 0.2% and 0.5% by weight of the total of the retardant composition. The rest of the retardant composition was composed of wetting agents, thickening agents and colouring agents.

The flame retardant composition thus prepared subjected to testing, gave the results shown in Table 3.

TABLE 3

| Test conditions | | | Classification per % of weight consumed | |
|---|---|---|---|---|
| Treatment | Dose | Concentration | Test 2 | Water |
| 15 min. dropping + 30 min. oven 42° C. | 1 l/m$^2$ | 1:4 | 0 (11%) | 4 (91%) |
| 15 min. dropping + 90 min. oven 42° C. | 1 l/m$^2$ | 1:4 | 0 (14%) | 4 (94%) |
| 15 min. dropping + 3 hours oven 42° C. | 1 l/m$^2$ | 1:4 | 1 (25%) | 4 (95%) |

As shown in Table 3, the weight of the fuel in the area treated with the retardant composition of test 2 has decreased in relation to the retardant composition of test 1, substantially improving its classification. As was to be expected, the addition of wetting agents, thickening agents and colouring agents make the flame composition drain less in the vegetation and remain more time acting in the treated area, thus increasing the composition efficacy.

Test 3:

The flame retardant composition subjected to testing was on this occasion a composition wherein a liquid ammonium polyphosphate intervenes wherein an ammonium polyphosphate in powder form, corrosion inhibitors and at least one wetting agent, a thickening agent (organic or inorganic) and at least one colouring agent were incorporated.

In said retardant composition, the liquid ammonium polyphosphate was of short chain length, with a number n of condensation groups between 2 and 3, with an ammonia content expressed in the form of nitrogen of approximately 10% by weight of the total of the liquid ammonium polyphosphate, and with a phosphorous content expressed in the form of phosphoric anhydride of approximately 30% by weight of the total of the liquid ammonium polyphosphate.

The ammonium polyphosphate incorporated in powder form was of long chain length, with a number n of condensation groups between 900 and 1000, approximately 970, with an ammonia content expressed in the form of nitrogen of approximately 13.5% by weight of the total of the ammonium polyphosphate in powder form, and with a phosphorous content expressed in the form of phosphoric anhydride of approximately 70% by weight of the total of the ammonium polyphosphate in powder form.

The composition of test 3 was composed of ammonium polyphosphate in aforementioned liquid form with a content of approximately 91% by weight of the total of the flame retardant composition, and by the ammonium polyphosphate in powder form with a content of approximately 9% by weight of the total of the flame retardant composition tested.

In relation to the ammonia content expressed in the form of nitrogen of the retardant composition tested, this was of approximately 10% by weight of the total of the flame retardant composition, whilst the phosphorous content expressed in the form of phosphoric anhydride was of approximately 33% by weight of the total of the flame retardant composition.

The corrosion inhibitors for aluminium, steel, bronze and magnesium alloys which were incorporated were metal salts of orthophosphoric acid, in particular, zinc orthophosphate dihydrate in a proportion between 0.01% and 5%, of approximately 0.25% by weight of the total of the retardant composition.

The flame retardant composition described in this section subjected to testing, gave the results shown in Table 4.

TABLE 4

| Test conditions | | | Classification per % of weight consumed | |
| --- | --- | --- | --- | --- |
| Treatment | Dose | Concentration | Test 3 | Water |
| 15 min. dropping + 30 min. oven 42° C. | 1 l/m² | 1:4 | 0 (13%) | 4 (91%) |
| 15 min. dropping + 90 min. oven 42° C. | 1 l/m² | 1:4 | 0 (17%) | 4 (94%) |
| 15 min. dropping + 3 hours oven 42° C. | 1 l/m² | 1:4 | 0 (18%) | 4 (95%) |

It should be mentioned that in the third test, only water in the same conditions with which the aforementioned tests have been performed was used as control test, observing that the fire consumes almost all the fuel, since the percentage of weight consumed ranges from 91% to 95%.

The fire efficacy tests expressed in percentage of weight consumed of fuel and whose results are shown in Table 4, show that a greater efficacy is achieved against fire due to the synergic effect that occurs when, in the flame retardant composition, there intervenes a liquid ammonium polyphosphate of short chain length combined with an ammonium polyphosphate in powder form of long chain length in the form wherein both have been described in test 3.

In particular, comparing the results of Table 3 with those of Table 4 reveals the improvement in the increase in efficacy when the fuel treated with the diluted retardant composition is left to rest for 15 minutes at ambient temperature and later kept in an oven at 42±2° C. during 3 hours. This improvement is relevant since the characterization of long term retardant compositions is determined when the greater efficacy is produced after the water has evaporated during the three hours in the oven.

Test 4:

Test 4 described here was performed in accordance with the corrosion test method that the USDA Forest Service has established for fire fighting by the use of aerial means.

The corrosiveness tests have been performed in accordance with the flame retardant compositions of Tests 1, 2 and 3, for aluminium 2024 T3, steel 4130, brass and magnesium AZ 31-B alloys, corresponding Sample 1, Sample 2 and Sample 3 with the flame retardant composition tested in test 1, in test 2 and in test 3, respectively.

To perform test 4, both concentrated and diluted retardant compositions were used. The diluted solutions in the samples were prepared mixing one volume of the concentrated retardant composition with four volumes of water.

The test tubes used to perform test 4 were aluminium 2024 T3, steel 4130, brass and magnesium AZ 31-B alloys.

The test tubes once clean (degreased), dried and weighed, were immersed, totally and partially, suspended by a nylon thread, within glass containers provided with screw caps and containing the flame retardant composition and without dilution in water. The test tubes were tested by total immersion and partial immersion. The tubes partially immersed were done so in 50% of their length.

The glass jars with the test tubes totally and partially immersed in the samples of different flame retardant compositions were stored during ninety days at ambient temperature and at 50° C. After ninety days, the test tubes were removed, washed and dried, then weighing them to determine the corrosiveness of the samples expressed in mm/year calculated from the weight loss of the test tube exposed to the action these retardants later described.

The results obtained in test 4 from the different test tubes for the three samples of retardant compositions were stated in Tables 5, 6, 7 and 8.

TABLE 5

Test 4. Aluminium corrosiveness [mm/year]

| Retardant composition | Concentrate | | | | Diluted | | | |
|---|---|---|---|---|---|---|---|---|
| | 25° C. total | 25° C. partial | 50° C. total | 50° C. partial | 25° C. total | 25° C. partial | 50° C. total | 50° C. partial |
| Sample 1 | 0.0475 | 0.0466 | 0.0538 | 0.0598 | 0.0611 | 0.0472 | 0.0380 | 0.0439 |
| Sample 2 | 0.0366 | 0.0604 | 0.0655 | 0.0684 | 0.0428 | 0.0613 | 0.0368 | 0.0539 |
| Sample 3 | 0.0342 | 0.0310 | 0.0227 | 0.0263 | 0.0328 | 0.0303 | 0.0244 | 0.0312 |

TABLE 6

Test 4. Steel corrosiveness [mm/year]

| Retardant composition | Concentrate | | | | Diluted | | | |
|---|---|---|---|---|---|---|---|---|
| | 25° C. total | 25° C. partial | 50° C. total | 50° C. partial | 25° C. total | 25° C. partial | 50° C. total | 50° C. partial |
| Sample 1 | 0.0145 | 0.0352 | 0.0063 | 0.0304 | 0.0124 | 0.0367 | 0.0073 | 0.0207 |
| Sample 2 | 0.0235 | 0.0604 | 0.0047 | 0.0121 | 0.0212 | 0.0403 | 0.0077 | 0.0298 |
| Sample 3 | No corrosion | 0.0040 | No corrosion | 0.0085 | 0.0104 | 0.0272 | 0.0026 | 0.0133 |

TABLE 7

Test 4. Brass Corrosiveness [mm/year]

| Retardant composition | Concentrate | | | | Diluted | | | |
|---|---|---|---|---|---|---|---|---|
| | 25° C. total | 25° C. partial | 50° C. total | 50° C. partial | 25° C. total | 25° C. partial | 50° C. total | 50° C. partial |
| Sample 1 | 0.0216 | 0.0136 | 0.0248 | 0.0205 | 0.0164 | 0.0230 | 0.0728 | 0.0734 |
| Sample 2 | 0.0050 | 0.0076 | 0.0177 | 0.0102 | 0.0038 | 0.0129 | 0.0520 | 0.0365 |
| Sample 3 | 0.0017 | 0.0010 | 0.0017 | 0.0022 | 0.0012 | 0.0017 | 0.0050 | 0.0078 |

TABLE 8

Test 4. Magnesium corrosiveness [mm/year]

| Retardant composition | Concentrate | | | | Diluted | | | |
|---|---|---|---|---|---|---|---|---|
| | 25° C. total | 25° C. partial | 50° C. total | 50° C. partial | 25° C. total | 25° C. partial | 50° C. total | 50° C. partial |
| Sample 1 | 0.9141 | 0.5627 | 1.0125 | 0.4978 | 0.8287 | 0.9412 | 0.9999 | 0.8051 |
| Sample 2 | 0.6604 | 0.3556 | 0.6858 | 0.3556 | 0.6504 | 0.5417 | 0.610 | 0.5951 |
| Sample 3 | 0.0391 | 0.0513 | 0.0459 | 0.1036 | 0.3048 | 0.3810 | 0.1651 | 0.3302 |

From the results of Tables 5, 6, 7 and 8 it is clearly and unequivocally gathered that the composition corresponding to Sample 3 is that with best results with respect to its corrosion inhibition action in the different alloys tested.

The invention claimed is:

1. A flame retardant composition for aerial fire fighting, comprising a liquid ammonium polyphosphate and ammonium polyphosphate in powder form in suspension; wherein:

the liquid ammonium polyphosphate has a chain length with a value of n, where n is 1 to 5, n being the number of condensation groups;

the ammonium polyphosphate in powder form has a chain length with a value of n, where n is 900 to 1500, n being the number of condensation groups;

the composition comprises at least one metal salt of the orthophosphoric acid as a corrosion inhibitor for alloys of aluminium, steel, bronze and magnesium, wherein the metal salt comprises a zinc orthophosphate salt; wherein the liquid ammonium polyphosphate content is 70% to 95% by weight of the total weight of the flame retardant composition; the ammonium polyphosphate in powder form is 5% to 13% by weight of the total weight of the flame retardant composition and the zinc orthophosphate salt is 0.01% to 5% by weight of the total weight of the flame retardant composition.

2. The flame retardant composition according to claim 1, wherein the zinc orthophosphate salt is an anhydrous or a hydrated zinc salt.

3. The flame retardant composition according to claim 2, wherein the zinc orthophosphate salt is a zinc orthophosphate dihydrate.

4. The flame retardant composition according to claim 3, wherein the proportion of the zinc orthophosphate dihydrate is 0.2% to 0.5% by weight of the total weight of the flame retardant composition.

5. The flame retardant composition according to claim 1, wherein the liquid ammonium polyphosphate has an ammonia content, expressed as nitrogen, that is 7% to 12% by weight of the total weight of the liquid ammonium polyphosphate.

6. The flame retardant composition according to claim 3, wherein the liquid ammonium polyphosphate has an ammonia content, expressed as nitrogen, that is 7% to 12% by weight of the total weight of the liquid ammonium polyphosphate.

7. The flame retardant composition according to claim 1, wherein the liquid ammonium polyphosphate has a phosphorous content, expressed as phosphoric anhydride, that is 20% to 37% by weight of the total weight of the liquid ammonium polyphosphate.

8. The flame retardant composition according to claim 6, wherein the liquid ammonium polyphosphate has a phosphorous content, expressed as phosphoric anhydride, that is 20% to 37% by weight of the total weight of the liquid ammonium polyphosphate.

9. The flame retardant composition according to claim 1, wherein the ammonium polyphosphate in powder form has an ammonia content, expressed in the form of nitrogen, that is 10% to 20% by weight of the total weight of the ammonium polyphosphate in powder form.

10. The flame retardant composition according to claim 1, wherein the ammonium polyphosphate in powder form has a phosphorous content, expressed in the form of phosphoric anhydride, that is 60% to 75% by weight of the total weight of the ammonium polyphosphate in powder form.

11. The flame retardant composition according to claim 9, wherein the ammonium polyphosphate in powder form has a phosphorous content, expressed in the form of phosphoric anhydride, that is 60% to 75% by weight of the total weight of the ammonium polyphosphate in powder form.

12. The flame retardant composition according to claim 1, wherein the ammonium polyphosphate in powder form has a granulometry expressed in mean particle size of 1 to 20 microns, and 100% of said particles have a size lower than 40 microns.

13. The flame retardant composition according to claim 9, wherein the ammonium polyphosphate in powder form has a granulometry expressed in mean particle size between 1 and 20 microns, and 100% of said particles have a size lower than 40 microns.

14. The flame retardant composition according to claim 10, wherein the ammonium polyphosphate in powder form has a granulometry expressed in mean particle size of 1 to 20 microns, and 100% of said particles have a size lower than 40 microns.

15. The flame retardant composition according to claim 11, wherein the ammonium polyphosphate in powder form has a granulometry expressed in mean particle size of 1 to 20 microns, and 100% of said particles have a size lower than 40 microns.

16. The flame retardant composition according to claim 1, wherein the ammonia content of the flame retardant composition expressed as nitrogen is 6% to 12% by weight of the total weight of the flame retardant composition.

17. The flame retardant composition according to claim 14, wherein the ammonia content of the flame retardant composition expressed as nitrogen is 6% to 12% by weight of the total weight of the flame retardant composition.

18. The flame retardant composition according to claim 1, wherein the phosphorous content of the flame retardant composition expressed as phosphoric anhydride is 30% to 40% by weight of the total weight of the flame retardant composition.

19. The flame retardant composition according to claim 17, wherein the phosphorous content of the flame retardant composition expressed as phosphoric anhydride is 30% to 40% by weight of the total weight of the flame retardant composition.

* * * * *